United States Patent
Buchanan et al.

(10) Patent No.: US 9,120,073 B2
(45) Date of Patent: Sep. 1, 2015

(54) DISTRIBUTED DIELECTRIC BARRIER DISCHARGE REACTOR

(75) Inventors: Walter Riley Buchanan, Overland Park, KS (US); Christopher Daniel Hruska, Blue Springs, MO (US)

(73) Assignee: EON LABS, LLC, Kansas City, KS (US)

(*) Notice: Subject to any disclaimer, the term of this patent is extended or adjusted under 35 U.S.C. 154(b) by 677 days.

(21) Appl. No.: 12/479,500

(22) Filed: Jun. 5, 2009

(65) Prior Publication Data
US 2010/0310434 A1    Dec. 9, 2010

(51) Int. Cl.
*B01J 19/08* (2006.01)
*B01J 12/00* (2006.01)
*B01J 19/00* (2006.01)
*H05H 1/24* (2006.01)

(52) U.S. Cl.
CPC ............ *B01J 19/0093* (2013.01); *B01J 19/088* (2013.01); *H05H 1/24* (2013.01); *B01J 2219/00783* (2013.01); *B01J 2219/00824* (2013.01); *B01J 2219/00826* (2013.01); *B01J 2219/00828* (2013.01); *B01J 2219/00831* (2013.01); *B01J 2219/00853* (2013.01); *B01J 2219/00869* (2013.01); *B01J 2219/0809* (2013.01); *B01J 2219/0815* (2013.01); *B01J 2219/0835* (2013.01); *B01J 2219/0843* (2013.01); *B01J 2219/0847* (2013.01); *B01J 2219/0892* (2013.01); *H05H 2245/121* (2013.01)

(58) Field of Classification Search
None
See application file for complete search history.

(56) References Cited

U.S. PATENT DOCUMENTS

| | | |
|---|---|---|
| 4,399,016 A | 8/1983 | Tsukada et al. |
| 5,387,842 A | 2/1995 | Roth et al. |
| 5,399,832 A | 3/1995 | Tanisaki et al. |
| 5,414,324 A | 5/1995 | Roth et al. |
| 5,872,426 A | 2/1999 | Kunhardt et al. |
| 6,005,349 A | 12/1999 | Kunhardt et al. |
| 6,118,218 A | 9/2000 | Yializis et al. |
| 6,147,452 A | 11/2000 | Kunhardt et al. |
| 6,429,400 B1 | 8/2002 | Sawada et al. |
| 6,433,480 B1 | 8/2002 | Stark et al. |
| 6,441,553 B1 | 8/2002 | Yializis et al. |
| 6,489,585 B1 | 12/2002 | Nakamura et al. |
| 6,774,335 B2 | 8/2004 | Yanobe et al. |
| 6,818,193 B2 | 11/2004 | Christodoulatos et al. |
| 6,946,793 B1* | 9/2005 | Nelson .................... 313/582 |
| 7,098,420 B2 | 8/2006 | Crowe et al. |
| 7,273,995 B1 | 9/2007 | Manz et al. |
| 7,399,944 B2 | 7/2008 | DeVries et al. |
| 7,507,934 B2 | 3/2009 | Kondou et al. |
| 2004/0094401 A1* | 5/2004 | Carlow et al. .................. 204/168 |
| 2006/0150911 A1* | 7/2006 | Miyairi et al. ............ 118/723 E |
| 2006/0208650 A1* | 9/2006 | Kondou et al. ........... 315/111.21 |

* cited by examiner

*Primary Examiner* — P. Kathryn Wright
(74) *Attorney, Agent, or Firm* — Hovey Williams LLP

(57) ABSTRACT

A plasma reactor consisting of a plurality of elements placed between two or more plasma generating electrodes is presented. Said elements consisting of surfaces, conducting, and/or dielectric which allow for the dielectric isolation of the electrodes from each other and creating a plurality of dielectrically isolated spaces for plasma generation. This plasma reactor achieves a high surface area, with low capacitance allowing simplified construction and is suitable for high frequency operation.

5 Claims, 12 Drawing Sheets

PRIOR ART

*PRIOR ART*

DISTRIBUTED DIELECTRIC BARRIER DISCHARGE REACTOR

BACKGROUND

1. Field

The present invention relates to a plasma generation reactor. In particular it relates to a reactor that is configured with a plurality of surfaces between two electrically excited electrodes. This structure allows glow discharge operation at high frequencies and high voltage potentials resulting in high overall ionization of target gasses or fluids to be treated.

2. Prior Art

It is known that glow discharge is generated by placing a dielectric material between two electrodes and applying a high-voltage alternating current or a periodic pulse voltage, and in the plasma field resulting there from, active species, radicals, and ions are generated so as to facilitate decomposition and further reaction of a gas or liquid (refer to U.S. Pat. No. 5,414,324). Plasmas formed in this manner are commonly referred to as dielectric barrier discharges. Further it is known that gasses decomposed by the application of dielectric barrier discharge can be reformed into more desirable forms. For example process and automobile exhaust gasses have been treated with such reactors (refer to U.S. Pat. No. 7,507,934).

The plasma and resulting ion formation in dielectric barrier discharges is dependent on the periodic change in the direction of current flow through the reactor. This periodic change in the direction of flow is controlled by the applied AC or pulsed DC voltage and the rate of change of current flow is controlled by the rate of change of the applied voltage, commonly referred to as dV/dt, at the reactor electrodes. Ion formation in the plasma is greatest during the most rapid field change (U.S. Pat. No. 7,399,944). In maximizing ion formation it is generally desirable to operate dielectric barrier discharges at higher frequencies and higher dV/dt.

Ions in dielectric barrier discharges are concentrated at the surfaces inside the plasma field (U.S. Pat. No. 7,298,092). Therefore, increasing surface area in the plasma field is a generally accepted method of increasing reactor plasma generation capacity.

Finally, it is also generally desirable to increase the size of dielectric barrier discharge reactors to accommodate higher volume processing.

In present dielectric barrier discharge reactor designs increasing the reactor size while maintaining a high surface area to gas/fluid volume ratio directly increases the capacitance of the reactor. This higher capacitance is in conflict with the desire to operate at higher frequencies and provide higher dV/dt at the reactor. As a result, present dielectric barrier discharge reactor designs incur practical limitations in achieving increased ion formation rates due to limitations in operating frequency and dV/dt as the surface areas are increased.

One approach to solving the capacitance problem is to increase the space between the plasma generation electrodes. However, wide spaces for plasma generation result in relatively high percentages of gas remaining un-ionized in areas away from surfaces. Further, when recombination of ions into more desirable species is required, a surface to hold the ionized particle until recombination occurs will accelerate the recombination. It has also been shown (U.S. Pat. No. 7,298,092) that these larger distances between electrodes lead to instabilities in plasma current across the dielectric surfaces. These instabilities can cause parts of the reactor to have weak or non-existent plasma current flow. The prior art does not address the current understanding that streamer formation is not only a function of the distance between electrodes, but also a function of the distance between the dielectric surfaces. Finally, streamer formation is exacerbated at the pulse cycle end, or in low frequency driven systems and is the subject of extensive research (U.S. Pat. No. 7,399,944). One method to solve this problem is to simply increase the drive frequency of the reactor. However this is difficult on slower, higher capacitance reactors.

This leads to a desire for a reactor with low capacitance and high surface area to gas/fluid volume ratio indicating that smaller distances between surfaces is desirable. The present invention presents a novel solution to these problems.

Multiple electrode designs as described in U.S. Pat. No. 7,507,934 (see FIG. 1a, 1b, 1c) attempt to solve one of these limitations and describe a method of increasing the reactor surface area to gas ratio. However, these designs involving multiple electrically connected electrodes result in much higher reactor capacitance.

In addition, it is known that multiple electrically interconnected electrode designs such as intermediate electrodes and multiple electrode designs (U.S. Pat. No. 7,507,934) are used in some plasma reactors such as depicted in FIG. 1. These reactor designs rely on multiple electrically driven plasma generation electrodes to generate plasma in the space between them. Along with the limitations noted above, this design has the tendency of the plasma to form filaments and other non-uniform conduction modes, due to the proximity of the relatively low impedance plasma generation electrodes.

As a general class of reactor design, multiple electrode designs suffer from high capacitance and plasma current non-uniformity particularly as the surface area is increased. This characteristic of the prior art has lead to a diversity of electrode designs to mitigate this non-uniform plasma current problem.

Various electrode configurations and designs result in more uniform plasma current conduction than others and further result in more desirable plasma discharges. These include slotted or perforated electrodes such as in U.S. Pat. Nos. 6,005,349 and 6,818,193. In addition perforated dielectrics have been used to enhance the desirable characteristics of plasma as in U.S. Pat. No. 5,872,426. However, using variations of electrodes does not resolve the capacitance issue. In addition these perforated electrodes cause areas of weakened plasma field in areas around the perforations.

As stated above, it has been shown that higher operating frequencies result in higher plasma energy into a reactor. U.S. Pat. No. 7,507,934 discusses frequencies of greater than 100 Hz, but fails to address operation of that design at higher frequencies. Multi-electrode designs such as these increase the capacitance dramatically over two electrode versions making higher frequency operation more problematic and therefore further limiting the efficiency of the reactor.

SUMMARY OF THE INVENTION

The present invention has for its object to provide a method and an arrangement of a plasma reactor and reactor systems for use in gas and/or fluid chemical reactions. For purposes of clarity, the term gas will be used for both gas and other fluid materials to be reacted. In addition, the term electrode may be used to identify plasma generation electrodes (numbers 26 and 28) and the term element or elements may be used generally for identifying all elements (numbers, 27, 36, 37a, 37b, 41, 42, 43, 44, 46, 47, 48, 56, 57, 61, 62, 65, 66, 71, 74 and 81) between the plasma generation electrodes and not directly connected to the plasma generation electrodes. Spaces between the various elements and electrodes may be maintained by spacers 23.

For illustration purposes the design in FIG. 2 (a, b, c) is reviewed. However the invention should not be construed as being limited to this or the following embodiments. Various alterations, modification and improvements may be made within the scope of this based on the knowledge of a person skilled in the art. This summary reviews one embodiment of a plasma reactor that can be used for many chemical synthesis and separation applications. For clarity purposes in this example, a hydrogen and nitrogen disassociation and recombination reaction to form ammonia is considered. Also, in many applications, gasses not used in the desired end product can be used with the reactant gas to enhance the effects and rate of the reaction, but again for simplification these will not be considered in this example. Those familiar with the art will also realize that catalysts, promoters, porous and non-porous particles and surfaces used alone or in various combinations, microstructures, surface textures, particles including nanoparticles can be used either in a fluid form or as part of the electrodes and are included as part of this invention.

A multi-element reactor designed to disassociate nitrogen and hydrogen and recombine the disassociated ions into ammonia is presented according to this invention. In this form, the reactor consists of two electrically excited, isolated electrodes and a number of non-electrically excited dielectric elements in combination with conductive elements in the middle with spaces between the electrodes. A mixture of nitrogen and hydrogen gas is passed through the spaces created by the electrodes, dielectric elements, and electrically isolated conductive elements. The plasma generation electrodes are electrically excited with sufficient energy (AC or pulsed DC voltages can be used in this application) to create a plasma capable of molecular disassociation in some or all the spaces between the electrodes of some or all the molecules in the spaces. A percentage of the nitrogen and hydrogen molecules disassociate or partially disassociate according to known art and become ions. These ions move toward one of the plasma generation electrodes or dielectric elements according to the electric charge and become available for a reaction with other ions. As the majority of most recombination reactions occur at a surface, it is desirable for a large amount of surface area to be available for recombination reaction. Thus by minimizing the distance from surface to surface and increasing the number of spaces using non-electrically excited electrodes, the surface area available for recombination sites is increased. Further, by minimizing the thickness of the total thickness of the dielectrics, the excitation energy is not generally increased compared to that required for a conventional single space reactor.

In one embodiment similar to FIG. 2a, a five dielectric element design (six spaces) reactor was used with plasma generation electrodes on each end. This reactor comprised 228 square cm of surface area in the reactor and using approximately 100 micron spaces between elements resulted in an initial capacitance of 25.7 pF. This compares favorably to a traditional two electrode tube reactor with approximately 1580 um spacing from electrode to electrode and a surface area of 205 square cm resulting in a reactor capacitance of 141 pF. This reduction in the reactor capacitance by more than five-hundred percent greatly simplifies the drive electronics.

This novel approach to reactor design allows an increase in surface area, and a reduction in capacitance, without a dramatic increase in the excitation voltage required to create a plasma. In addition, the current required for creating the excitation voltage to generate the plasma is reduced as a function of total surface area in the reactor due to the low reactor capacitance. Finally, by creating multiple surfaces close to each other, the formation of filaments was greatly reduced, resulting in a more uniform glow plasma.

The first embodiment in FIG. 2(a) results in a plasma generation device comprising: a plurality of dielectric elements which are disposed between two or more unit plasma generation electrodes creating a plurality of spaces between said unit plasma generation electrodes. Said unit plasma generation electrodes may or may not be dielectrically isolated from said spaces The plasma generation electrodes being capable of generating plasma in the spaces by application of an AC or pulsed DC voltage, or some combination thereof between the unit plasma generation electrodes, wherein the plasma is generated in the spaces formed by the plurality of dielectric elements.

These and other objects are achieved by the present invention having a plurality of plasma formation plasma discharge spaces allowing a continuous, semi-continuous or batch mode gas or gas mixture flow. Said plasma discharge spaces comprising at least two spaced electrically excited electrodes (Plasma Generation Electrodes, 26 FIG. 2 through 8), and at least one center electrically isolated electrode (dielectric elements, or other elements described herein) wherein at least one plasma pulse is generated by applying an energizing voltage to the electrodes causing a plasma current and a displacement current. The plasma dielectric elements may or may not be electrically conductive depending on the particular requirements of the design, but when electrically conductive at least one non-conductive surface is placed between or adhered to the face of the two electrodes forming a space which is dielectrically isolated from the plasma generation electrodes 26. The present invention therefore provides a plurality of spaces and electrically isolated dielectric elements or other elements being excited by plasma generation electrodes 26.

A second embodiment of this invention in FIG. 3 allows the ability to modify the intensity of the plasma at various points within the reactor by variation of dielectric constant in materials used in various parts of the reactor. This can be accomplished using several approaches, each having utility in various applications. For example, the dielectric constant of the dielectric elements, the dielectric coating on the isolated conductive elements, when present, or complete elements with varying dielectric constant, is effective in altering the plasma intensity in the adjacent space.

Another method of changing the plasma intensity at various points is illustrated in FIG. 4(a), 4(b), while controlling the gas flow through the reactor, is to vary the space between elements. This can be done generally by changing the space from element to element. This results in a plasma dielectric element according to the description above, wherein the distance between the adjacent dielectric elements to each other varies over the entire length and width and is different than the distance between the dielectric elements adjacent to each other in the remaining portion. In addition, spacing can be changed over just a portion of an element by changing the general shape and thickness of the element. This has additional utility as a flow control system to direct gasses to desirable areas, to maintain a gas in the plasma for a longer or shorter duration, or to mix gasses. This results in a dielectric element wherein with respect to the plasma dielectric elements in the remaining portion, the distance between the plasma dielectric elements adjacent to each other is further varied over a portion, or the entire plasma dielectric element.

All of the electrode and element surfaces can be additionally coated, impregnated, or manufactured from materials that enhance the desired reaction. These materials can be promoters, catalysts or porous materials including nano-particles, or combinations of the same which increase the surface area and/or enhance the desired reaction.

In several embodiments of this invention (FIG. 5), conductive elements used in concert with dielectrically isolated elements are used to increase the reactor element usefulness. Plasma energy will be transferred to any conductor within the plasma field via capacitive coupling. By using a single conductive surface dielectrically isolated on both sides, the plasma energy supplied from the electrodes can be re-distributed over the surface of such an element. In addition, by using a partial conductor, dielectrically isolated in one area of an element, plasma energy can be focused on a desired location within a space. Finally, by changing the space from area to area by modifying the thickness, and placement of the conductor with an element, both gas flow through any space and plasma strength at any point with the reactor can be modified.

Through experiments conducted by the inventors, it has been shown that increasingly small spacing in a multi-dielectric reactor shown in FIG. 2 significantly improves current flow uniformity and plasma uniformity. Isolated embedded conducing elements (56 and 71) may also be applied in a way that allows extension of the plasma discharge region beyond the area directly between the plasma generating electrodes. This provision allows relatively simple construction to provide complex plasma generation configurations while limiting the reactor capacitance and maintaining the ability to operate at high frequencies with relatively simple power sources.

Further embodiments shown in FIGS. 6(a)-6(e) and FIGS. 7(a)-7(b) demonstrate the flexibility of this novel design to allow various features such as the insertion of one or more conductive elements in conjunction with various dielectric elements in FIG. 6(a). In FIG. 6(b) by inserting conductive elements with gas and/or liquid entry and exit points in the reactor, reactions can be further tailored to the process desired. FIG. 6(c) illustrates an embodiment with only one side of each conductive element coated with a dielectric surface within a plasma space. FIG. 6(d) illustrates the ability to maintain the gas in the plasma field for an extended period by extending the path over several layers of the plasma reactor. FIG. 6(e) shows the insertion of a porous material the gas must flow through as the gas exits the plasma field. This allows a large surface area to be present at the plasma exit and the reaction can be further enhanced by inserting catalysts or other reaction promoters into or on this surface.

BRIEF DESCRIPTION OF THE DRAWINGS

FIG. 1(a) is an isometric view of a multi-unit electrode reactor of the prior art.

FIG. 2(a) is an isometric view of a one embodiment of a distributed dielectric barrier discharge reactor.

FIG. 7(a) is an isometric view of one embodiment of the present invention with extended, electrically isolated conductive elements. FIG. 7(b) is a cross sectional view of the section taken along line C-C' shown in FIG. 7(a), cut along a plane parallel to one direction (the gas flow direction).

DETAILED DESCRIPTION OF THE DRAWINGS

Embodiments of the present invention will be described below in detail with reference to the drawings. The present invention is not limited to the following embodiments and changes in design and modifications could be made appropriately based on a common knowledge of a person skilled in the art without departing from the spirit and scope of the present invention. By integrating the various design features and elements described herein in various combinations, and with fewer or greater number of elements, reactors can be designed using the methods and elements in this invention to produce similar of different desired reaction outcomes.

Figure 1A:
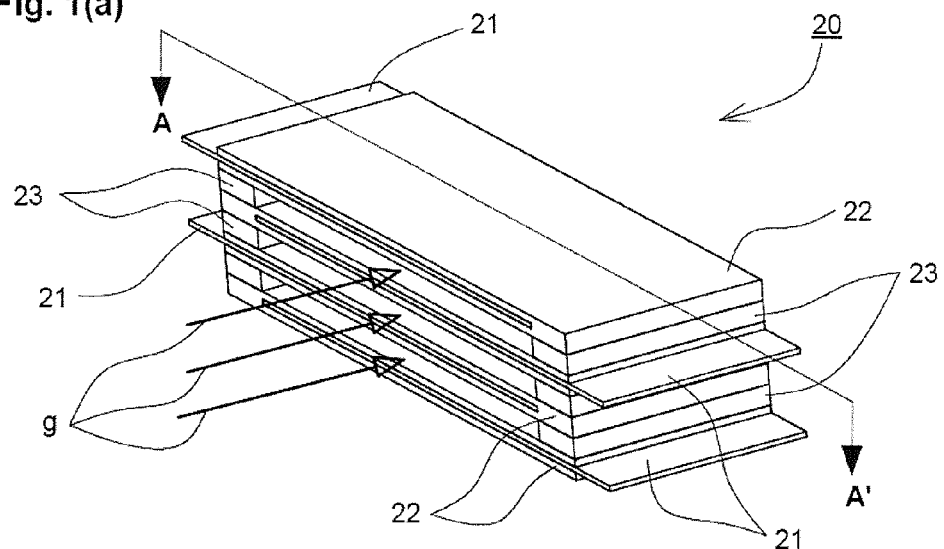
FIGS. 1(a)(b)(c) schematically show an example of a plasma generation device of the prior art (U.S. Pat. No. 7,507,934).
Figure 1B:
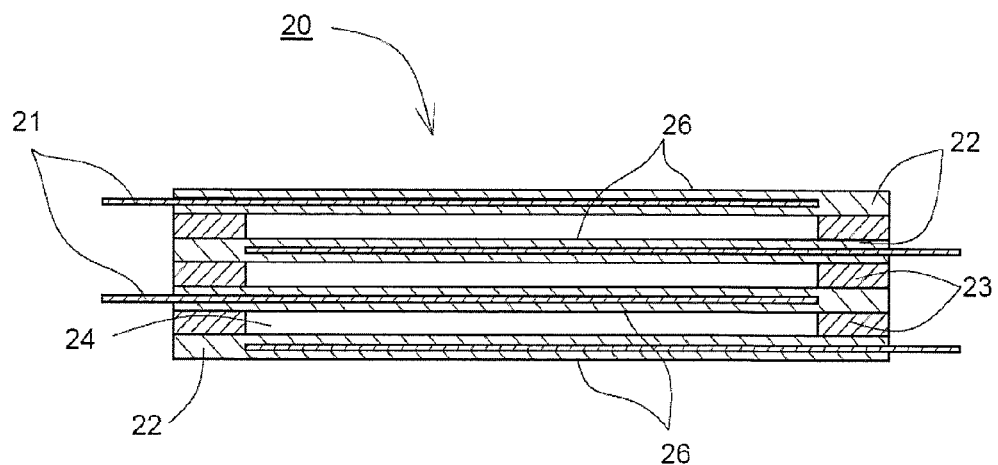
FIG. 1(b) is a cross sectional view of the section taken along line A-A' shown in FIG. 1(a), cut along a plane perpendicular to one direction (fluid flow direction).
Figure 1C:
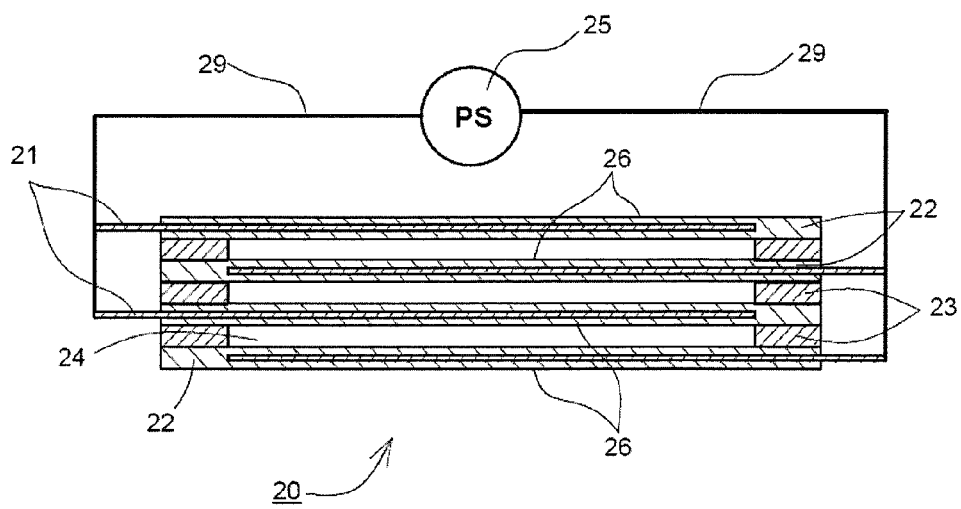
FIG. 1(c) is a cross sectional view of the section taken along line A-A' shown in FIG. 1(a), showing an example of typical electrical connection of the unit electrodes.

FIG. 1(a), FIG. 1(b), and FIG. 1(c) schematically show prior art of a unit plasma generation device or reactor 20 according to existing art (see U.S. Pat. No. 7,507,934). FIG. 1(a) is an isometric view showing a unit reactor 20 indicating the direction of the fluid or gas g to be acted upon by the plasma. FIG. 1(b) and FIG. 1(c) are cross sectional schematic views cut along line A-A' cut in a direction perpendicular to the plane of the gas or fluid flow through the unit reactor 20. The plasma generation conductors 21 are contained in a dielectric material 22 making unit plasma generation electrodes 26 with the conductors dielectrically isolated from the plasma discharge region 24. Said regions 24 are created using plasma-discharge-region dielectric spacers 23 which force the gas or fluid to flow through the regions 24 to become influenced by said plasma. FIG. 1(c) shows the electrodes connected to an AC or pulsed DC plasma voltage generation source 25 via conductors 29 which provide energy to stimulate the plasma in all regions 24.

Figure 2A:
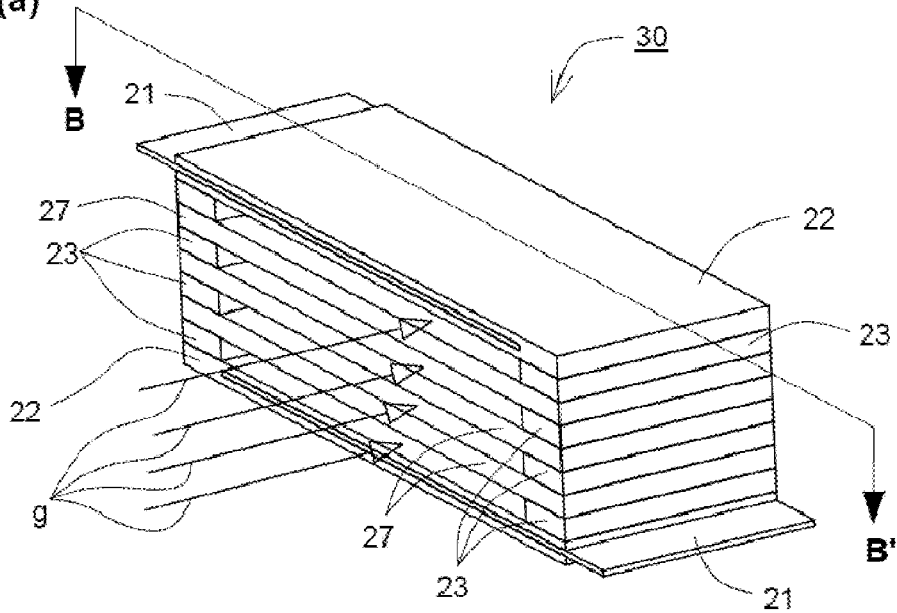
FIGS. 2(a), (b), (c) are schematic views of one embodiment of the present invention showing a two unit plasma generation electrode version of a distributed dielectric reactor.
Figure 2B:
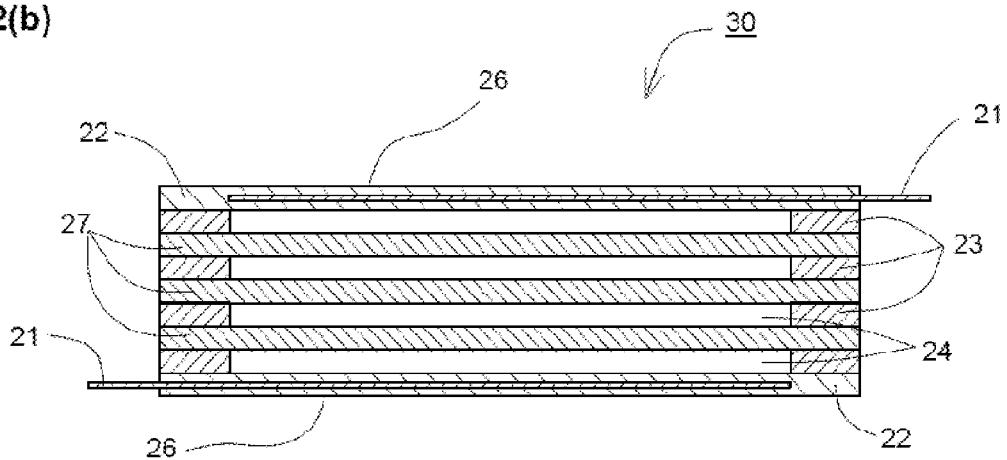
FIG. 2(b) is a cross sectional view of the section taken along line B-B' shown in FIG. 2(a), cut along a plane perpendicular to one direction (fluid flow direction).
Figure 2C:
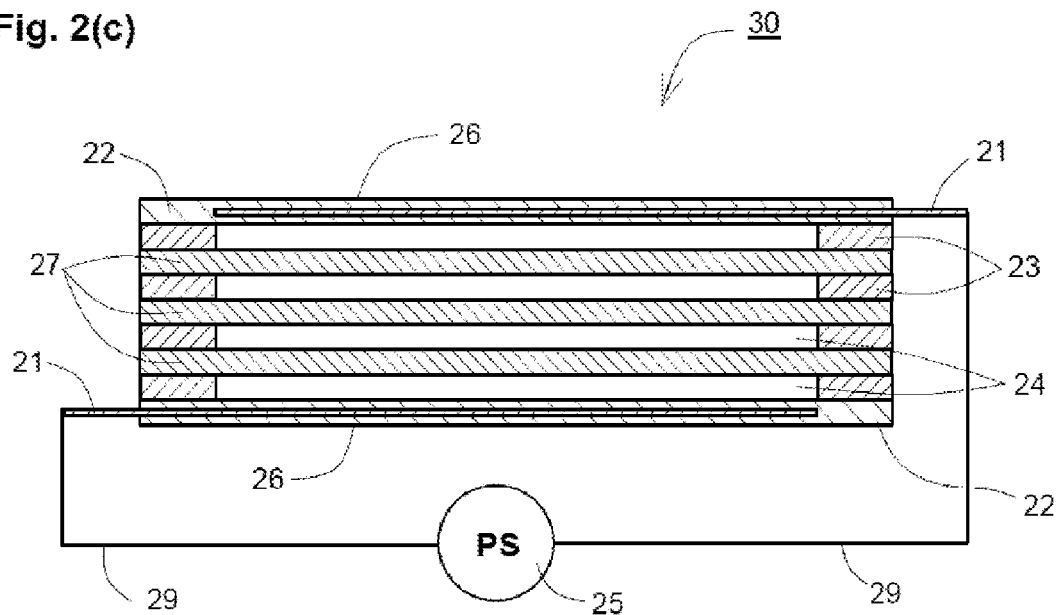
FIG. 2(c) is a cross sectional view of the section taken along line B-B' shown in FIG. 2(a), showing one embodiment of the electrical connection of the unit electrodes.

FIGS. 2(a), 2(b) and FIG. 2(c) schematically show an embodiment 30 of the present invention with two conductors 21, which are electrically isolated by a dielectric material 22 as in FIG. 2(a) from the regions 24 resulting in two unit plasma generation electrodes 26 which are connected to an AC or pulsed DC voltage source 25 via conductors 29. In this embodiment a plurality of dielectric elements 27 are placed between the electrodes 26 creating a plurality of plasma-discharge regions 24. There may be only a first dielectric spacer 23 and a second dielectric spacer 23 between a first electrode 26 and its adjacent dielectric element 27. There may be only a first dielectric spacer 23 and a second dielectric spacer 23 between a second electrode 26 and its adjacent dielectric element 27. There may be only a first dielectric spacer 23 and a second dielectric spacer 23 between adjacent pairs of dielectric elements 27. The dielectric elements are composed of tabular ceramic, glass, aluminum oxide, or quartz material although other dielectric materials may be used for these embodiments herein. Said regions 24 are created using spacers 23 which seal the side and force the gas or fluid to flow through the regions 24 in the direction indicated by arrows g where the gas or fluid become subjected to said plasma in the regions 24. Said regions 24 can be from 1 micron to 20 millimeters from dielectric element 27 to dielectric element 27 and from dielectric element 27 to unit plasma generation electrode 26 depending on the thickness of the spacer 23 used. Micro spheres or other shapes of similar materials to the tabular dielectric elements can be distributed in the region 24 to maintain dimensional stability over large areas. These construction techniques are applicable to the embodiments that follow. Dielectric elements 27 can be from 10 micro meters to 50 millimeters as required to withstand the applied plasma excitation voltage and facilitate construction of the unit.

Using common methods known to those skilled in the art, multi-layer reactors are assembled by stacking tabular dielectric elements and spacers, and where desired, micro spheres or other shapes for dimensional stability are added to the region 24. In one embodiment, low alkaline glass one hundred microns (100 um) thick is used for both spacers 23 and dielectric elements 27, with one hundred micron diameter micro spheres dispersed between the dielectric elements in the region 24 for dimensional stability. This stack is then heated to a temperature which caused the dielectric elements 27, spacers 23 and micro spheres to adhere to each other and become one unit. Electrodes consisting of a slice of a semiconductor silicon wafer cut to the desired dimensions and coated with a glass of like expansion coefficients are then sealed to the unit using a glass frit to form the electrodes. The unit reactor was then inserted into an appropriate housing and sealed to create channels for gas or fluid to flow into and out of the unit reactor. A person skilled in the art will be able to assemble this type of reactor unit in a variety of ways with good results. The various embodiments below are assembled using similar simple techniques and will be obvious to anyone skilled in the art.

FIG. 2(b) is a cross sectional schematic view of reactor 30 cut along line B-B' as shown in FIG. 2(a), in a plane perpendicular to the direction of gas flow g. In this embodiment the plasma generation spaces 24 are isolated from each other by dielectric elements 27.

FIG. 2(c) is a is a cross sectional schematic view of reactor 30 cut along line B-B' as shown in FIG. 2(a), in a plane perpendicular to the direction of gas flow g. FIG. 2(c) shows the unit plasma electrodes connected to an AC or pulsed DC plasma voltage generation source 25 via conductors 29 which provide energy to stimulate the plasma in all regions 24.

Figure 2D:
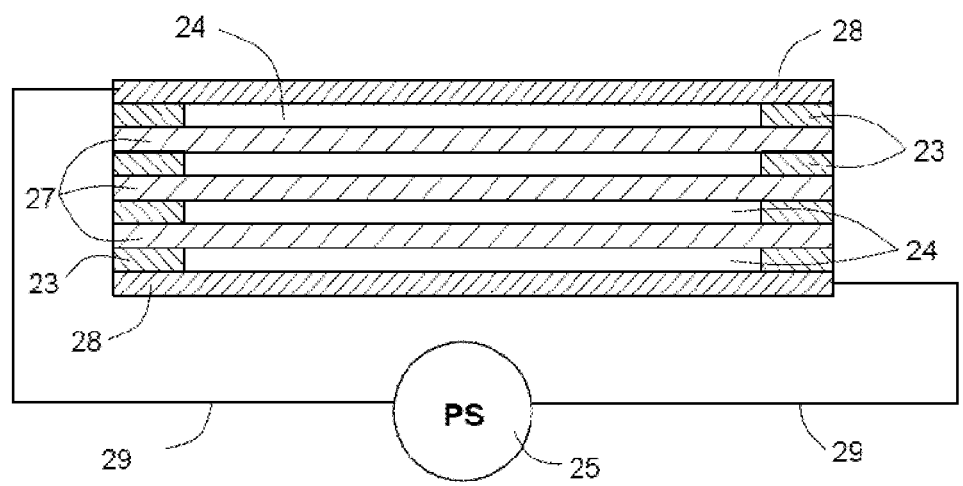
FIG. 2(d) is a schematic view of one embodiment of the present invention showing a two unit plasma generation electrode version with non-dielectrically isolated plasma generation electrodes and one embodiment of the electrical connection to the unit plasma generation electrodes.

FIG. 2(d) shows a cross sectional schematic of a second embodiment of the reactor and conductors 21 in which there is no dielectric isolation between the conductor and the adjacent region 24. As only one side of any region must be dielectrically isolated for plasma to form, these non-isolated unit plasma generation electrodes can be used where there is dielectric isolation on the opposing side. Non-dielectrically isolated electrodes 28 are advantageous in unit reactors with a high number of dielectric elements 27 as this eliminates one layer of dielectric that can be added back into the design and used to form an additional region 24. In addition, non-dielectrically isolated electrodes 28 allow simplified construction and can be formed using conventional means to create entry and exit points for fluid or gas used in the plasma reaction. Where non-dielectrically isolated electrodes 28 are used with non-dielectrically isolated conductive elements 56, the plasma will transition to arc mode in region 24 adjacent to the electrodes 28. Although not effective for ionization, this is useful in reactors for other purposes. In all of the embodiments, both electrodes 26 and conductors 28 can be used as required for construction and performance.

Figure 3:
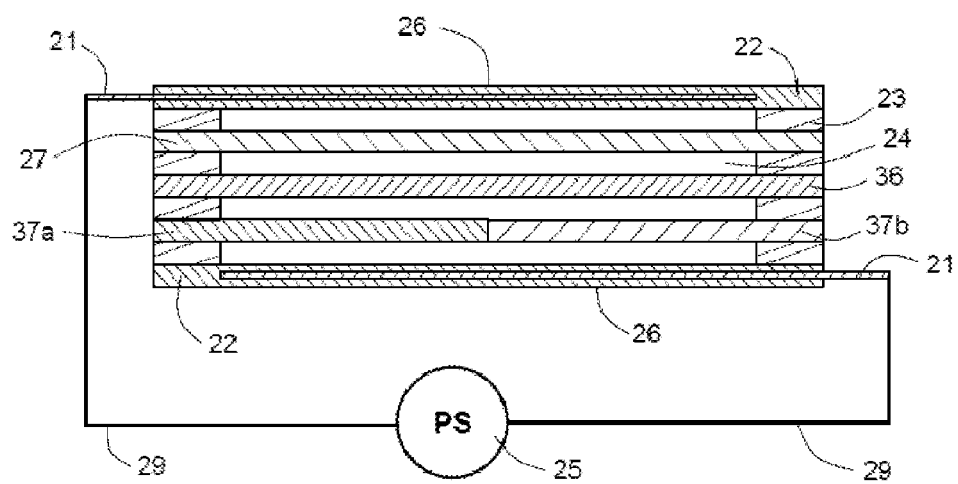
FIG. 3 is a cross sectional schematic view of one embodiment of the present invention showing variation in materials and dielectric constant, electrical and mechanical properties of the dielectric elements.

FIG. 3 is a cross sectional schematic view of an embodiment of the present invention with a plurality of dielectric elements 36 placed between the unit plasma generation electrodes 26 creating a plurality of regions 24. In this embodiment, said dielectric elements 27, 36, and 37a are made of materials exhibiting dielectric constant which varies over the surface of the dielectric element. This variation is both over the direction of the gas flow and perpendicular to the gas flow. This enables plasma strengths which vary over the surface of the dielectric element 27, 36, 37a and 37b at different points in the reactor. As an example, strengthening the plasma at the entrance to the reactor and weakening the plasma at the exit of the reactor, results a higher level of ionized molecules as they enter the reactor and allows ions to react gradually as they exit. Conversely, having a weaker plasma at the entrance and stronger plasma at the exit can cause other desirable reaction outcomes. Also, having stronger plasmas from one side of the reactor or the other can be used to create variable reactions or to allow the injection of gas or fluid into stronger or weaker plasmas in the sides of the reactor or into the reactor through a conductive element as discussed in later figures.

Figure 4A:
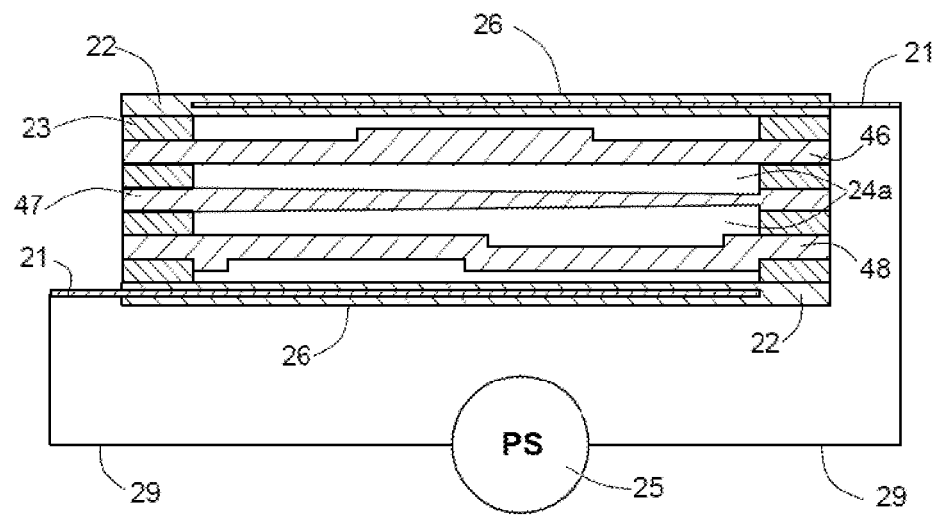
FIG. 4(a) is a cross sectional schematic view of one embodiment of the present invention showing variation in the thickness of the plasma dielectric elements across the reactor.
Figure 4B:
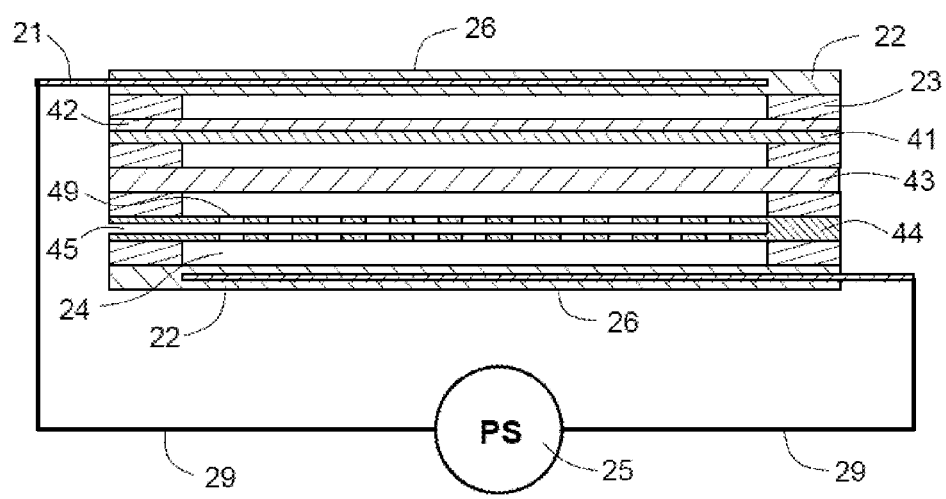
FIG. 4(b) is a cross sectional schematic view of one embodiment of the present invention showing variation in the thickness, composition and structure of the dielectric elements across the reactor.

FIG. 4(a) is a cross sectional schematic view of an embodiment of the present invention with a plurality of dielectric elements 47, 48, and 49 placed between the unit plasma generation electrodes 26 creating a plurality of plasma spaces 24a. In this embodiment, said dielectric elements 46, 47, and 48 are made of materials of different thicknesses both in the direction perpendicular to the gas flow and in line with the gas flow and at various directions toward and away from the gas flow. This allows channeling of various gasses and fluids and the creation of different strength plasmas in various areas to affect the outcome of the reaction. FIG. 4(b) is a cross sectional schematic view of an embodiment of the present invention with a plurality of dielectric elements 41, 42, 43 and 44, placed between the unit plasma generation electrodes 26 creating a plurality of plasma spaces 24. Dielectric elements may be comprised of two or more bonded layers of dissimilar dielectric materials 41 and 42 to create a single element, allowing tailoring of the plasma strength in adjacent space 24. In addition, by utilizing different areas of entry into the reactor for different gasses, mixtures can be tailored to affects the reaction outcomes. This includes the entry and exit of gases and fluids through channels 45 or holes 49 in the dielectric element(s), or from holes in the spacers 23.

Figure 5:
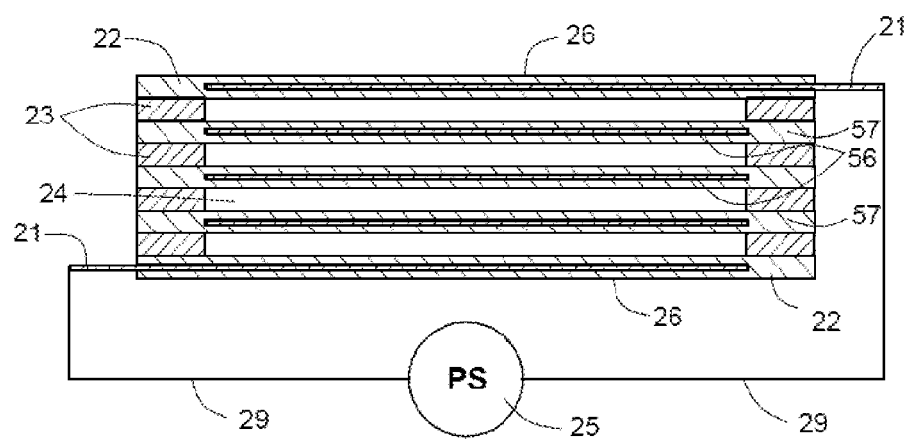
FIG. 5 is a cross sectional schematic view of one embodiment of the present invention showing a dielectric elements which contain a conductive element which is not connected to the power source.

FIG. 5 is a cross sectional schematic view of an embodiment of the present invention with a plurality of dielectric elements 57 are placed between the unit plasma generation electrodes 26 creating a plurality of regions 24. The dielectric element(s) 57 in this embodiment contain conductive element(s) 56 either throughout the plasma dielectric element 57 or partially through the dielectric element 57. This enables the plasma to be concentrated, diluted, distributed, or re-distributed throughout the space in a manner that affects the reaction outcome. Said conductors can be very thin as a deposited conductive film on a ceramic, quartz, glass or other surface or very thick enabling complex dielectric elements to be manufactured. Such complex dielectric elements 57 can be used to inject or remove gases and/or fluids into the reactor unit at desired points in the region 24.

Figure 6A:
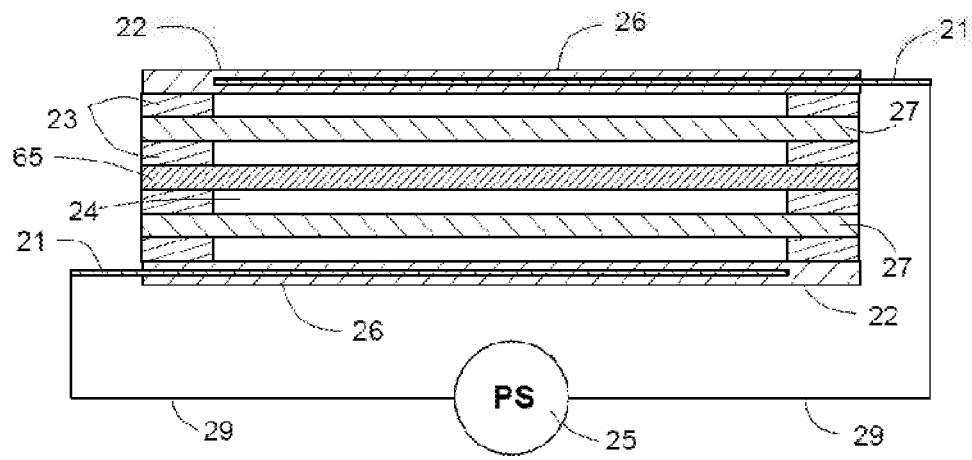
FIG. 6(a) is a cross sectional schematic view of one embodiment of the present invention showing dielectric elements and a conductive element which is not isolated by a dielectric from the adjacent space where plasma forms.
Figure 6B:
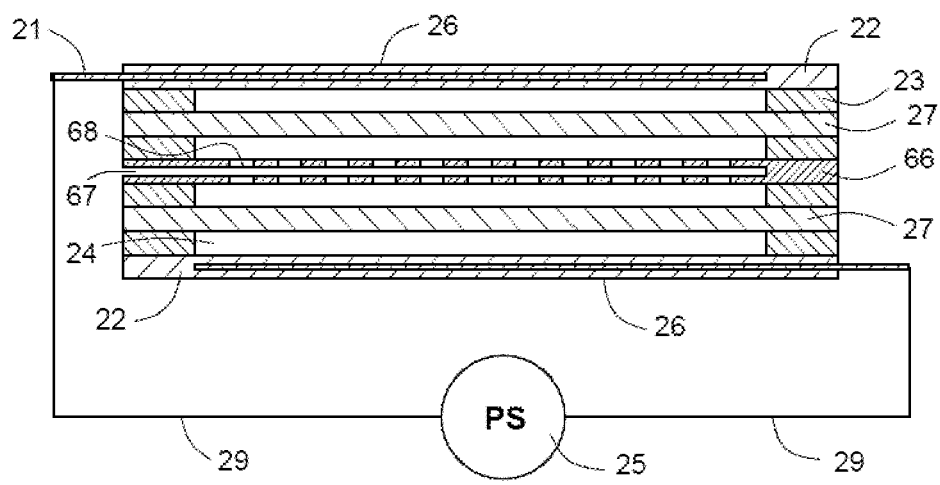
FIG. 6(b) is a cross sectional schematic view of one embodiment of the present invention showing dielectric elements and a conductive element which performs complex functions and is not isolated by a dielectric from the adjacent space where plasma forms.

FIG. 6(a) is a cross sectional schematic view of an embodiment of the present invention with one or a plurality of dielectric elements 27 and one or a plurality of conductive elements 65 placed between the unit plasma generation electrodes 26 creating a plurality of plasma spaces 24. Conductive elements 65 can be arbitrarily thin or very thick without negatively impacting the performance of the reactor unit. Plasma will form in the regions 24 adjacent to the conductive surface as only one side in each region 24 needs to have dielectric isolation in order to form plasma, this embodiment simplifies the design of some of the elements in the reactor and allows for a higher degree of complexity without sacrificing the plasma function. FIG. 6(b) shows a further embodiment of the conductive element 66 using common methods to form the conductive element 66 containing entry and exit points 67 and 68 for gasses and fluids flowing into and out of the reactor. The interior of the conductor 66 is not part of the plasma reaction shielding any gases or fluids within from the plasma field. Also, the conductive element 66 can be made thicker to strengthen the plasma field in said area, or thinner or more resistive in an area to modify the plasma field in said area. Facilitating entry and exit points and making parts of the conductive element 66 thicker or thinner allows additional flexibility in unit reactor design to enhance desired outcomes. Finally, such conductive elements 65 or 66 can be used to cool the unit reactor by providing coolant paths for a gas or liquid through the reactor which will not be affected by the plasma regions 24.

Conductive elements 65 and 66 such as those in FIG. 6(a) and FIG. 6(b) must have at least one surface of the adjacent region 24 isolated or the plasma will transition to arc mode and no glow discharge plasma will be maintained in said region 24.

Figure 6C:
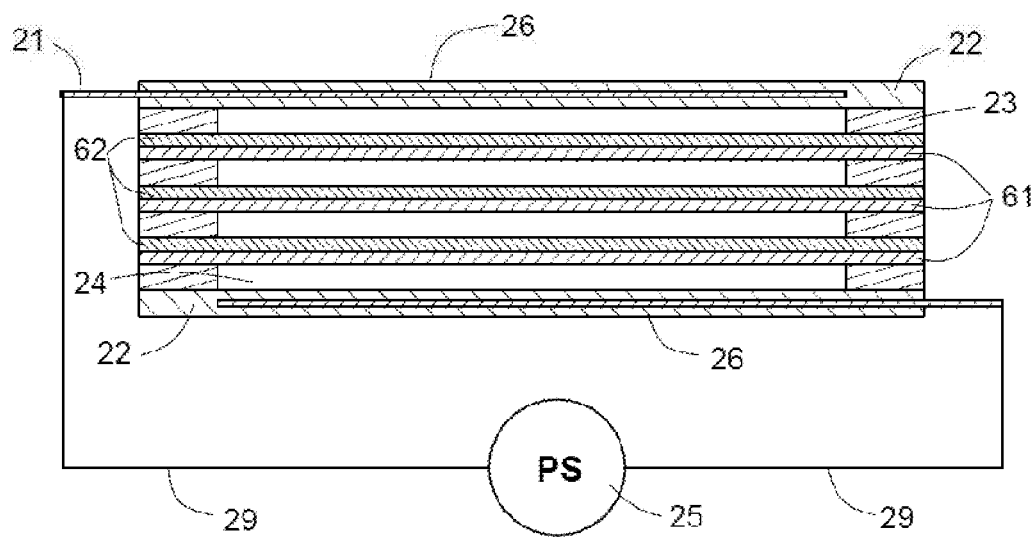
FIG. 6(c) is a cross sectional schematic view of one embodiment of the present invention showing dielectric elements and a conductive element which is isolated on one side by a dielectric from the adjacent space where plasma forms.

FIG. 6(c) is a cross sectional schematic view of an embodiment of the present invention with a plurality of conductive elements 61 dielectrically isolated on one side 62 placed between the unit plasma generation electrodes 26 creating a plurality of regions 24. The conductive portion of these elements can be continuous or discontinuous over the surface enabling the plasma to be concentrated, diluted, distributed, or re-distributed throughout the space in a manner that affects the reaction outcome.

Figure 6D:
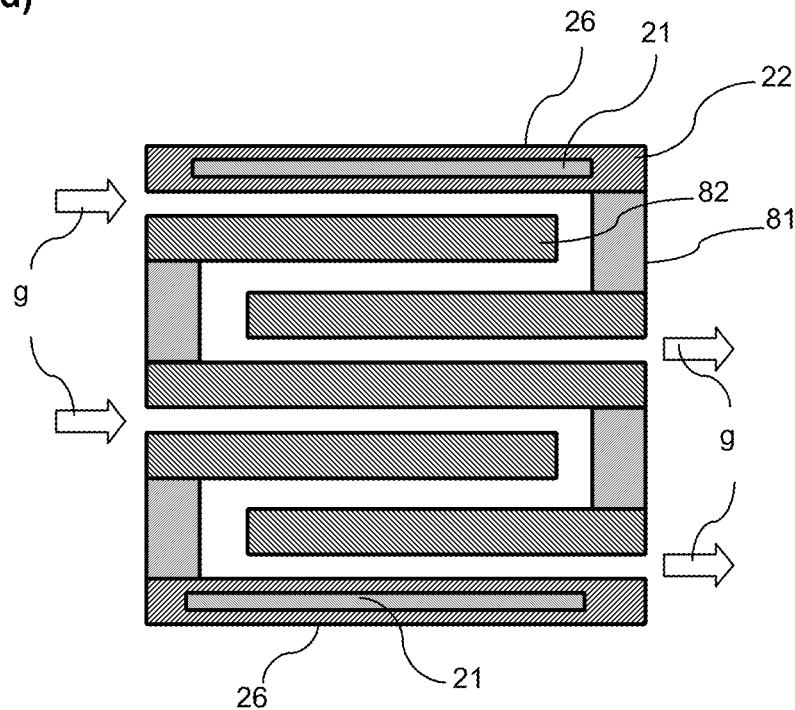
FIG. 6(d) is a cross sectional schematic view of one embodiment of the present invention taken parallel to the indicated gas flow showing interconnected spaces for extension of the fluid flow path through the plasma generation device.

FIG. 6(d) is a cross sectional schematic view of an embodiment of the present invention with a plurality of dielectric elements configured in such a manner as to increase the distance the gas must travel before exiting the reactor. The dielectric elements 82 have been shortened and dielectric elements 81 have been placed blocking some of the entrances and exits from the reactor causing the gas flow to be extended through the unit reactor. Using this embodiment on part or all of a unit reactor, gas flows can be modified to optimize the process desired. In addition constructions using holes between layers can be used for other purposes such as mixing gasses between reactor layers.

Figure 6E:
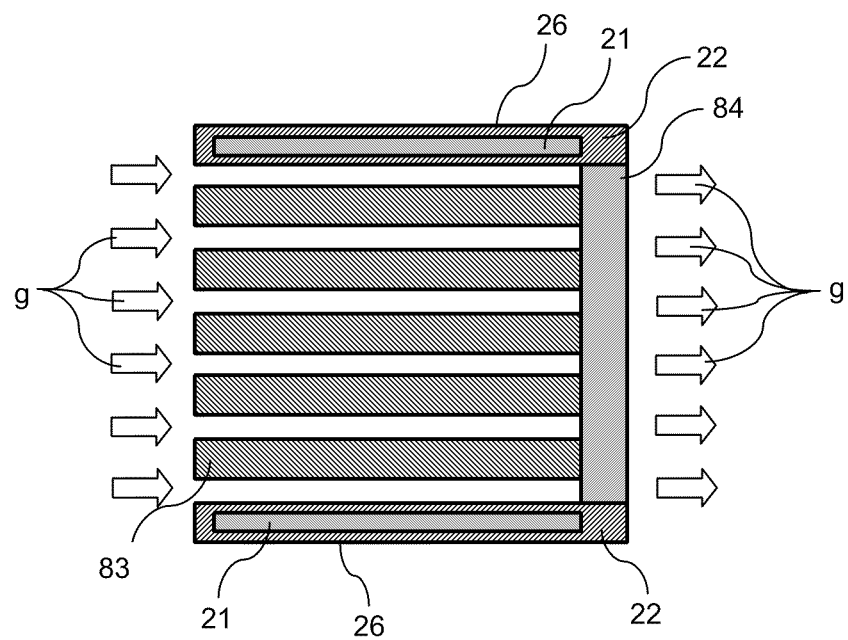
FIG. 6(e) is a cross sectional schematic view of one embodiment of the present invention taken parallel to the indicated gas flow showing a porous material affixed to one end of the plasma generation device through which process fluid must pass.

FIG. 6(e) is a cross sectional schematic view of an embodiment of the present invention with a plurality of dielectric elements 83 configured in such a manner as to direct the gas through the reactor and through the blocking element of porous material 84 before exiting the reactor. Said porous material is used to enhance the surface area as the gas exits the plasma. In addition, catalysts and other reaction promoters can be coated onto the surface, embedded in or otherwise contained in said porous material. Using this embodiment on part or all of a unit reactor, gas flows can be modified to optimize the process desired.

Figure 7A:
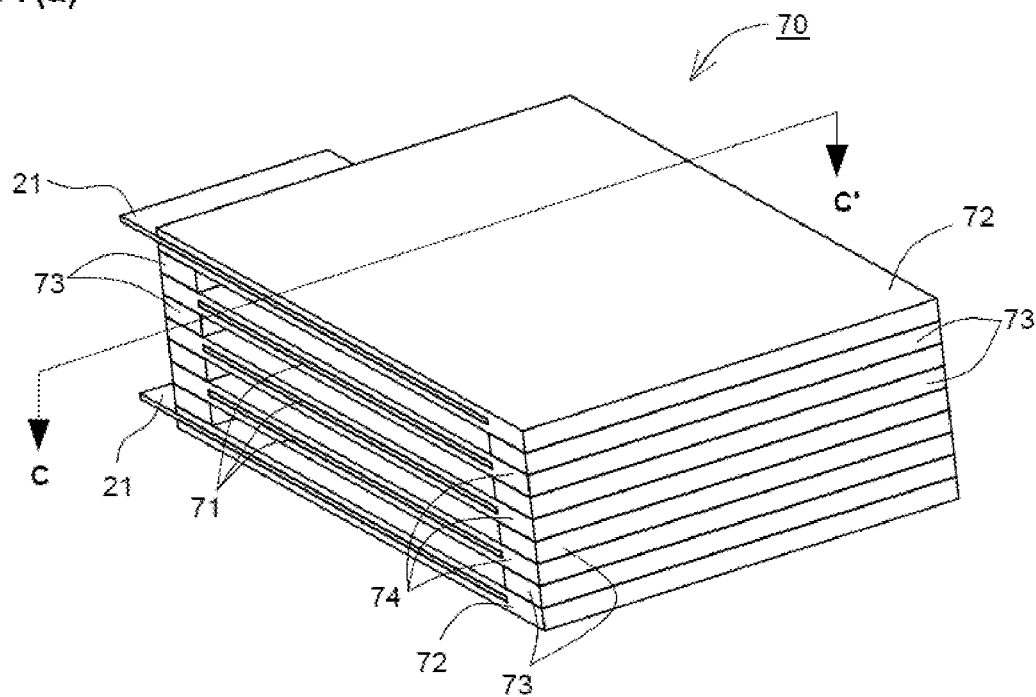
FIG. 7(a) and FIG. 7(b) are schematic views of one embodiment of the present invention showing dielectrically isolated conductive elements projecting beyond the plasma generation electrodes in the direction of the gas flow.
Figure 7B:
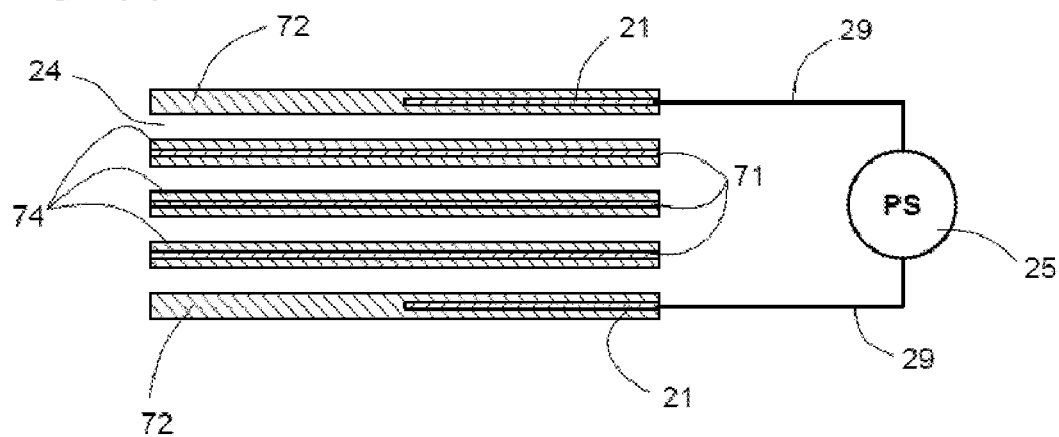

FIG. 7(a) is an isometric schematic view of an embodiment of the present invention with a plurality of conductive elements 71 having dielectric isolation 74. Dielectric spacers 73 are placed between elements 74 creating a plurality of regions 24. The conductive portion of both the plasma generation electrodes 21 and the elements 71 and 74 can be continuous or discontinuous over the surface enabling the plasma to be concentrated, diluted, distributed, or re-distributed throughout the space in a manner that affects the reaction outcome. Further the conductive portion of the isolated elements 71 extend beyond the plasma generation electrodes 21 enabling the plasma field to be extended beyond the electrode. FIG. 7(b) is a cross sectional schematic view taken along the line C-C' shown in FIG. 7(a) and cut along a plane parallel to direction of gas flow g. This configuration allows the gradual initiation of the plasma field and/or the gradual diminishing of the plasma field as desired for various reactions.

Figure 8:
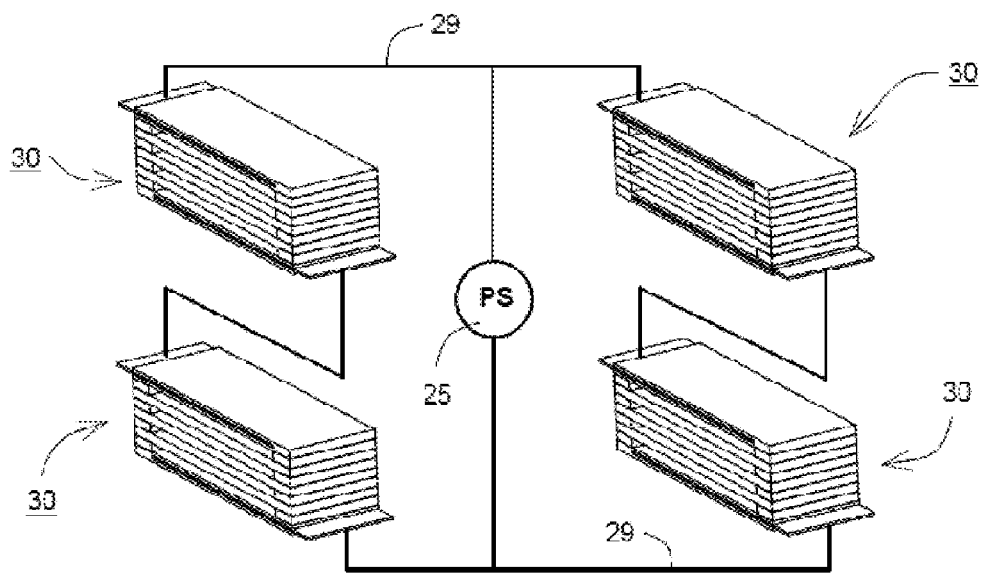
FIG. 8 is an isometric schematic view of the electrical connection of unit plasma generation devices in serial and parallel to the plasma generation power source.

FIG. 8 is an isometric schematic view of a unit reactor cluster consisting of 4 unit reactors 30 connected to an AC or pulsed DC plasma voltage generation source 25 via conductors 29 which provide power for generation of the plasma. As shown, unit reactors 30 can be connected to the source 25 in serial, in parallel, or in serial and parallel combinations depending on the voltage generation source 25 and unit reactor 30 configurations desired by the system designer. Any of the embodiments can be connected in this manner or other serial or parallel combinations as desired to enable desired outcomes. In addition, different embodiments can be connected with each other to segment reactions and optimize system performance.

In all embodiments, elements 27, 36, 37a, 37b, 41, 42, 43, 44, 46, 47, 48, 56, 57, 61, 62, 65, 66, 71, 74, 82, and 83 can be used in a unit reactor with plasma generation electrodes both dielectrically isolated 26 and non-dielectrically isolated 28. Accordingly, the apparatus and method of the present invention provide:

- a reactor with low capacitance reactor with high surface area;
- a reactor capable of simplified excitation from low to high frequency;
- a reactor capable of diverse function for disassociation and re-association of gasses and/or fluids;
- a reactor with simplified manufacturing and assembly.

From the foregoing, it may be seen that the invention of the distributed dielectric barrier discharge reactor apparatus and method of using the same is particularly well suited for the proposed usages thereof. Furthermore, since certain changes may be made in the above invention without departing from the scope thereof, it is intended that all matter contained in the above description or shown in the accompanying drawings be interpreted as illustrative and not in a limiting sense. It is also to be understood that the following claims are to cover certain generic and specific features described herein.

We claim:

1. A plasma generation device comprising:

a first unit plasma generation electrode and a spaced-apart second unit plasma generation electrode, each operable to connect to an electric power source supplying a voltage difference therebetween, each electrode coated at least in part with dielectric material;

a plurality of dielectric elements formed from dielectric material positioned in a stack spaced apart from and not in contact with the first unit plasma generation electrode and the second unit plasma generation electrode and positioned therebetween, the dielectric elements being spaced apart from one another to define a plurality of plasma generating gaps between adjacent pairs of dielectric elements and between the dielectric elements and the first and second unit plasma generation electrodes, the dielectric elements having the same length as the first and second plasma generation electrodes, wherein the dielectric elements do not include conductive material; and a plurality of dielectric spacers creating a single gap having the height of a single dielectric spacer between adjacent pairs of dielectric elements, between the dielectric elements and the first unit plasma generation electrode, and between the dielectric elements and the second unit plasma generation electrode such that plasma is generated in the gaps, wherein there is only a first dielectric spacer and a second dielectric spacer between the first unit plasma generation electrode and the dielectric element adjacent the first unit plasma generation electrode and positioned at opposing edges of the dielectric material of the first unit plasma generation electrode, only a first dielectric spacer and a second dielectric spacer between the second unit plasma generation electrode and the dielectric element adjacent the second unit plasma generation electrode and positioned at opposing edges of the dielectric material of the second unit plasma generation electrode, and only a first dielectric spacer and a second dielectric spacer between adjacent pairs of dielectric elements positioned at opposing edges of the adjacent pairs of dielectric elements, such that outer edges of the first dielectric spacer and the second dielectric spacer between adjacent pairs of dielectric elements are aligned with outer edges of the adjacent pairs of dielectric elements.

2. The plasma generation device according to claim 1, wherein each plasma generating gap includes an inlet at one end of the plasma generation device, an outlet at an opposing end of the plasma generation device, and a gas flow path therebetween, such that the inlet, the gas flow path, and the outlet are aligned with one another.

3. The plasma generation device according to claim 2, wherein gas flow is linear along the gas flow path from the inlet to the outlet.

4. The plasma generation device according to claim 1, wherein the first unit plasma generation electrode is roughly planar and forms a first tab that extends outward from a first side of the plasma generation device and the second unit plasma generation electrode is roughly planar and forms a second tab that extends outward from a second side of the plasma generation device, opposite the first side.

5. The plasma generation device according to claim 4, wherein the first and second tabs are connected to the electric power source.

* * * * *